United States Patent
Nakao

(10) Patent No.: US 7,697,593 B2
(45) Date of Patent: Apr. 13, 2010

(54) MULTIPLE-INPUT MULTIPLE-OUTPUT (MIMO) TIMING SYNCHRONIZATION USING CORRELATION WITH FIRST AND SECOND KNOWN SIGNAL

(75) Inventor: Seigo Nakao, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 817 days.

(21) Appl. No.: 11/515,894

(22) Filed: Sep. 6, 2006

(65) Prior Publication Data

US 2007/0053461 A1 Mar. 8, 2007

(30) Foreign Application Priority Data

Sep. 6, 2005 (JP) .............................. 2005-258411

(51) Int. Cl.
*H04B 1/00* (2006.01)
(52) U.S. Cl. ...................................... 375/142; 375/354
(58) Field of Classification Search ................. 375/142, 375/354
See application file for complete search history.

(56) References Cited

U.S. PATENT DOCUMENTS

| | | | | |
|---|---|---|---|---|
| 5,991,289 | A * | 11/1999 | Huang et al. ................ | 370/350 |
| 6,452,936 | B1 | 9/2002 | Shiino | |
| 6,646,980 | B1 * | 11/2003 | Yamamoto et al. .......... | 370/208 |
| 6,842,487 | B1 * | 1/2005 | Larsson ....................... | 375/260 |
| 7,050,768 | B2 * | 5/2006 | Hosur et al. ................. | 455/103 |
| 7,424,067 | B2 * | 9/2008 | Vanderperren et al. ...... | 375/326 |
| 7,436,903 | B2 * | 10/2008 | Sandhu et al. ............... | 375/315 |
| 2003/0185241 | A1 * | 10/2003 | Lu et al. ...................... | 370/476 |
| 2003/0235147 | A1 * | 12/2003 | Walton et al. ............... | 370/204 |
| 2004/0076246 | A1 | 4/2004 | Vanderperren et al. | |
| 2005/0063297 | A1 * | 3/2005 | Sakata et al. ................ | 370/208 |
| 2005/0163244 | A1 * | 7/2005 | Seto et al. ................... | 375/267 |
| 2005/0195733 | A1 * | 9/2005 | Walton et al. ............... | 370/208 |
| 2005/0233709 | A1 * | 10/2005 | Gardner et al. ............. | 455/101 |
| 2005/0259567 | A1 * | 11/2005 | Webster et al. ............. | 370/208 |
| 2005/0281354 | A1 * | 12/2005 | Kim ........................... | 375/299 |

(Continued)

FOREIGN PATENT DOCUMENTS

JP 11-150521 6/1999

(Continued)

OTHER PUBLICATIONS

Jianhua, "A MIMO system with backward compatibility for OFDM based WLANs", 4th IEEE Workshop on Signal Processing Advances in Wireless Communications, 2003, SPAWC 2003, Jun. 15-18, 2003 pp. 130-134.*

(Continued)

*Primary Examiner*—Juan A Torres
(74) *Attorney, Agent, or Firm*—McDermott Will & Emery LLP

(57) ABSTRACT

A timing synchronization detects a temporary timing in a manner such that the presence of a first known signal in the received packet signal is detected by performing correlation processing on the first known signal in the received packet signal. The timing synchronization detects a timing in a manner that when the presence of a second known signal is detected, correlation processing is performed on the second known signal in the received packet signal. In the timing synchronization unit, a correlator is commonly used to perform two correlation processings.

5 Claims, 15 Drawing Sheets

U.S. PATENT DOCUMENTS

| | | | |
|---|---|---|---|
| 2005/0286474 A1* | 12/2005 | van Zelst et al. | 370/334 |
| 2006/0140303 A1* | 6/2006 | Egashira et al. | 375/299 |
| 2006/0222095 A1* | 10/2006 | Niu et al. | 375/260 |
| 2006/0251193 A1* | 11/2006 | Kopmeiners et al. | 375/345 |
| 2006/0252386 A1* | 11/2006 | Boer et al. | 455/101 |
| 2007/0060162 A1* | 3/2007 | Xhafa et al. | 455/450 |
| 2007/0097946 A1* | 5/2007 | Mujtaba | 370/349 |
| 2008/0049654 A1* | 2/2008 | Otal et al. | 370/311 |

FOREIGN PATENT DOCUMENTS

| | | | |
|---|---|---|---|
| JP | 11150521 A * | 6/1999 | |
| JP | 2003-110459 | 4/2003 | |
| JP | 2003110459 A * | 4/2003 | |
| JP | 2004-236266 | 8/2004 | |
| JP | 2004-241974 | 8/2004 | |
| JP | 2004236266 A * | 8/2004 | |
| JP | 2004241974 A * | 8/2004 | |
| WO | WO 2004/036861 A2 | 4/2004 | |

OTHER PUBLICATIONS

Jianhua Liu, "A MIMO system with backward compatibility for OFDM based WLANs", 4th IEEE Workshop on Signal Processing Advances in Wireless Communications, 2003, SPAWC 2003, Jun. 15-18, 2003 pp. 130-134.*

Jianhua Liu, "A MIMO system with backward compatibility for OFDM based WLANs", EURASIP Journal on Applied Signal Processing archive vol. 2004, (Jan. 2004) pp. 696-706.*

Syed Aon Mujitaba, "TGn Sync Proposal Technical Specification", IEEE P802.11, Jul. 2005, <ftp://ftp.802wirelessworld.com/11/04/11-04-0889-07-000n-tgnsync-proposal-technical-specification.doc>.

International Search Report and Written Opinion of the International Searching Authority issued in corresponding International Application No. PCT/JP2006/317099, dated Dec. 5, 2006.

Coleri et al., "Channel Estimation Techniques Based on Pilot Arrangement in OFDM Systems," IEEE Transactions on Broadcasting, Sep. 2002, pp. 223-229, vol. 48, No. 3.

* cited by examiner

PRIOR ART

FIG.3A

| L-STF | L-LTF | L-SIG | HT-SIG | HT-STF | HT-LTF | HT-LTF | -HT-LTF | HT-LTF | -HT-LTF | DATA 1 |
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | HT-LTF -400ns | DATA 2 |
| L-STF -100ns | L-LTF -100ns | L-SIG -100ns | HT-SIG -100ns | HT-STF -200ns | HT-LTF -200ns | HT-LTF -200ns | -HT-LTF -200ns | HT-LTF -200ns | -HT-LTF -200ns | DATA 3 |
| L-STF -150ns | L-LTF -150ns | L-SIG -150ns | HT-SIG -150ns | HT-STF -600ns | HT-LTF -600ns | HT-LTF -600ns | HT-LTF -600ns | HT-LTF -600ns | -HT-LTF -600ns | DATA 4 |

PRIOR ART

FIG.3B

| L-STF | L-LTF | L-SIG | DATA |

MULTIPLE-INPUT MULTIPLE-OUTPUT (MIMO) TIMING SYNCHRONIZATION USING CORRELATION WITH FIRST AND SECOND KNOWN SIGNAL

BACKGROUND OF THE INVENTION

1. Field of the Invention

The present invention relates to the receiving technology, and it particularly relates to a receiving method and apparatus for detecting the timing of a received packet signal, and a communication system utilizing the same.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards for wireless Local Area Network (LAN), such as IEEE802.11a/g and HIPERLAN/2. The packet signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carriers in the beginning of the burst signal, which is the so-called preamble or training signal. The other one is the known signal, provided for part of carriers in the data area of the packet signal, which is the so-called pilot signal (See Reference (1) in the following Related Art List, for instance).

Related Art List (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of data to be transmitted in parallel in the packet signal is called "stream"). That is, streams up to the maximum number of antennas are set for the communications between the transmitting apparatus and the receiving apparatus so as to improve the data transmission rates.

Moreover, combining such a MIMO system with the OFDM modulation scheme results in a higher data transmission rate. A known signal defined in a communication system which is not compatible with a MIMO system (hereinafter referred to "legacy system") is assigned to a leading part of a packet signal in such a MIMO system. Accordingly, a receiving apparatus of a legacy system recognizes the leading part of a packet signal and can recognize that it is the packet signal which is not to be received by the legacy system. As a result, the receiving apparatus of a legacy system stops receiving the rest of parts in the packet signal, thus reducing the power consumption. In the packet signal in a MIMO system, a known signal defined in a MIMO system is also assigned posterior to the known signal of a legacy system. The reason for this is as follows. A plurality of streams are transmitted in a MIMO system, whereas a single stream is transmitted in a legacy system. Hence, the signal strengths in the receiving apparatus differ, and the receiving apparatus sets the gain of amplifier according to the signal strengths.

Based on the known signals, the receiving apparatus detects the timing, detects the frequency offset, derives the receiving weight vectors, estimates the channel and so forth. Here, the detection of timing will be discussed. When the receiving apparatus receives packet signals, it detects the presence of a packet signal and at the same time detects the timing. Accordingly, the receiving apparatus performs correlation processing on between the received packet signal and a legacy known signal so as to detect the peak of correlation values. In so doing, a packet signal whose delay time is long shall also be received in order to raise the accuracy in detecting the presence of packet signal and therefore the range over which the addition is executed (hereinafter this range will be referred to as "correlation window") needs to be broad. However, when the correlation widow is broad, the timing in which a plurality of delayed wave components contained in the received packet signal are combined is detected. Thus, timing in which the effect of a plurality of delayed wave components contained in the received packet are taken into account is no longer detected. As a result, the highly accurate timing detection cannot be executed.

SUMMARY OF THE INVENTION

The present invention has been made in view of the foregoing circumstances and a general purpose thereof is to provide a receiving technique by which to detect the timing while the delayed wave components are being taken into account.

In order to solve the above problems, a receiving apparatus according to one embodiment of the present invention comprises: a receiver which receives a packet signal wherein the packet signal is such that a first data signal is assigned posterior to a first known signal, a second known signal is assigned posterior to the first data signal, and a second data signal is assigned posterior to the second known signal; a first detector which detects a temporary timing in a manner such that the presence of the first known signal in the packet signal is detected by performing correlation processing on the first known signal in the packet signal received by the receiver; a first processing unit which detects the presence of the second known signal in the packet signal, by processing the first data in the packet signal at the temporary timing detected in the first detector; a second detector which detects a timing by performing correlation processing on between the packet signal and the second known signal received in the receiver when the presence of the second known signal is detected by the first processing unit; and a second processing unit which processes the second data signal in the packet signal, at the timing detected by the second detector. The window width at the time when the correlation processing is performed in the second detector is set narrower than the window width at the time when the correlation is performed in the first detector.

"Correlation processing on the first known signal in the packet signal received" indicates a correlation processing which is performed to detect the first known signal from the received packet signal. Accordingly, an object whose correlation with the received packet signal is computed in the correlation processing may be arbitrary, and it may be a signal whose correlation value becomes large in the timing to which the first known signal is assigned in the received packet signal.

According to this embodiment, the window width at the time when the correlation processing is performed in the second detector is so set as to be narrower than the window width at the time when the correlation is performed in the first detector. Hence, the first known signal can be detected in the first detector with high probability and the timing can detected in the second detector with high accuracy.

Another embodiment of the present invention relates also to a receiving apparatus. This apparatus comprises: a receiver which receives a packet signal wherein the packet signal is such that a first data signal is assigned posterior to a first known signal, a second known signal is assigned posterior to the first data signal, and a second data signal is assigned posterior to the second known signal; a first detector which detects a temporary timing in a manner such that the presence of the first known signal in the packet signal is detected by performing correlation processing on between the packet signal received in the receiver and the first known signal; a first processing unit which detects the presence of the second known signal in the packet signal, by processing the first data in the packet signal at the temporary timing detected in the first detector; a second detector which detects a timing by performing correlation processing on between the packet signal received in the receiver and the second known signal when the presence of the second known signal is detected by the first processing unit; and a second processing unit which processes the second data signal in the packet signal, at the timing detected by the second detector. The window width at the time when the correlation processing is performed in the second detector is set narrower than the window width at the time when the correlation is performed in the first detector.

According to this embodiment, the window width at the time when the correlation processing is performed in the second detector is so set as to be narrower than the window width at the time when the correlation is performed in the first detector. Hence, the presence of the first known signal can be detected in the first detector with high probability and timing can detected in the second detector with high accuracy.

A correlator to perform the correlation processing in the first detector and a correlator to perform the correlation processing in the second detector may be put to a common use. In such a case, the correlators to be used for two correlation processings are put to a common use, so that the circuit scale can be reduced.

Still another embodiment of the present invention relates also to a receiving apparatus. This apparatus comprises: a receiver which receives a packet signal wherein the packet signal is such that a first data signal is assigned posterior to a first known signal, a second known signal is assigned posterior to the first data signal, and a second data signal is assigned posterior to the second known signal; a first detector which detects a temporary timing in a manner such that the presence of the first known signal in the packet signal is detected by performing auto-correlation processing on the first known signal in the packet signal received by the receiver; a first processing unit which detects the presence of the second known signal in the packet signal, by processing the first data in the packet signal at the temporary timing detected in the first detector; a second detector which detects a timing by performing cross-correlation processing on between the packet signal received by the receiver and the second known signal when the presence of the second known signal is detected by the first processing unit; and a second processing unit which processes the second data signal in the packet signal, at the timing detected by the second detector. The window width at the time when the cross-correlation processing is performed in the second detector is set narrower than the window width at the time when the auto-correlation is performed in the first detector.

According to this embodiment, the window width at the time when the cross-correlation processing is performed in the second detector is so set to be narrower than the window width at the time when the auto-correlation is performed in the first detector. Hence, the presence of the first known signal can be detected in the first detector with high probability and the timing can detected in the second detector with high accuracy. Since the auto-correlation and the cross-correlation are used, the accuracy in detecting the presence of the first known signal and the accuracy in detecting the timing can be improved.

The receiver also receives another packet signal that contains a first known signal and, in the another packet signal, constellation of part posterior to the first known signal may differ from constellation of at least part of a first data, and when in the packet signal received by the receiver the constellation of part posterior to the first known signal corresponds to the constellation of at lease part of the first data signal, it may be determined by the first processing unit that the presence of the second known signal in the packet signal has been detected. In this case, the presence of the second known signal is detected according to the constellation, so that additional signals by which to inform the presence are no longer necessary. Thus, the deterioration of transmission efficiency can be prevented.

The packet signal received in the receiver is composed of a plurality of streams, and while using as a reference a second known signal assigned to one of a plurality of streams, a cyclic timing shift within the second known signal is applied to a second known signal assigned to other stream, and the second detector may include: a derivation unit which derives, as candidates for timing, a timing corresponding to the second known signal serving as the reference and a timing corresponding to the second known signal to which a timing shift is applied, based on a correlation value; a shift unit which applies a timing shift corresponding to an amount of timing shift, to the second known signal to which a timing shift is applied, among the candidates for timing derived by the derivation unit; and a decision unit which determines a timing, based on the timing shifted by the shift unit and the timing corresponding to the second known signal serving as the reference among the candidates for timing derived by the derivation unit. In such a case, one timing is determined from the timings corresponding respectively to a plurality of streams. As a result, the effects of the plurality of respective streams can be taken into account and the timing can be detected with high accuracy.

The decision unit may select either the timing shifted by the shift unit or the timing corresponding to the second known signal serving as the reference among the candidates for timing derived by the derivation unit, whichever is located anterior to the other. In this case, the timing that exists in an anterior part is selected from a plurality of timings, so that the interference with a signal assigned to a posterior part can be reduced and hence the receiving characteristics can be enhanced.

A receiving apparatus further comprise a storage unit which stores the packet signal received by the receiver. When the second data signal in the packet signal is processed at the timing detected by the second detector, the second processing unit may process again the first data signal in the packet signal stored in the storage unit. In this case, the first data signal is once again processed at the timing detected with high accuracy, so that the processing accuracy of the first data signal can be enhanced.

Still another embodiment of the present invention relates to a communication system. This system comprises: a transmitting apparatus which transmits a packet signal wherein the packet signal is such that a first data signal is assigned posterior to a first known signal, a second known signal is assigned posterior to the first data signal, and a second data signal is assigned posterior to the second known signal; and a receiving apparatus which receives the packet signal from the transmitting apparatus. The receiving apparatus includes: a first detector which detects a temporary timing in a manner such that the presence of the first known signal in the packet signal is detected by performing correlation processing on the first known signal in the packet signal received; a first processing unit which detects the presence of the second known signal in the packet signal, by processing the first data in the packet signal at the temporary timing detected in the first detector; a second detector which detects a timing by performing correlation processing on the second known signal in the received packet signal when the presence of the second known signal is detected by the first processing unit; and a second processing unit which processes the second data signal in the packet signal, at the timing detected by the second detector. The window width at the time when the correlation processing is performed in the second detector is set narrower than the window width at the time when the correlation is performed in the first detector.

According to this embodiment, the window width at the time when the cross-correlation processing is performed in the second detector is so set as to be narrower than the window width at the time when the auto-correlation is performed in the first detector. Hence, the presence of the first known signal can be detected in the first detector with high probability and the timing can detected in the second detector with high accuracy.

Still another embodiment of the present invention relates to a receiving method. This method comprises: receiving a packet signal wherein the packet signal is such that a first data signal is assigned posterior to a first known signal, a second known signal is assigned posterior to the first data signal, and a second data signal is assigned posterior to the second known signal; detecting a temporary timing in a manner such that the presence of the first known signal in the packet signal is detected by performing correlation processing on the first known signal in the packet signal received in said receiving; detecting the presence of the second known signal in the packet signal, by processing the first data in the packet signal at the temporary timing detected in the detecting a temporary timing; detecting a timing by performing correlation processing on the second known signal in the packet signal received in the receiving when the presence of the second known signal is detected in the detecting the presence of the second known signal; and processing the second data signal in the packet signal, at the timing detected in the detecting a timing. The window width at the time when the correlation processing is performed in the detecting a timing is set narrower than the window width at the time when the correlation is performed in the detecting a temporary timing.

Another embodiment of the present invention relates also to a receiving method. This method comprises: receiving a packet signal wherein the packet signal is such that a first data signal is assigned posterior to a first known signal, a second known signal is assigned posterior to the first data signal, and a second data signal is assigned posterior to the second known signal; detecting a temporary timing in a manner such that the presence of the first known signal in the packet signal is detected by performing correlation processing on between the packet signal received in the receiving and the first known signal; detecting the presence of the second known signal in the packet signal, by processing the first data in the packet signal at the temporary timing detected in the detecting a temporary timing; detecting a timing by performing correlation processing on between the packet signal received in the receiving and the second known signal when the presence of the second known signal is detected; and processing the second data signal in the packet signal, at the timing detected by the detecting a timing. The window width at the time when the correlation processing is performed in the detecting a timing is set narrower than the window width at the time when the correlation is performed in the detecting a temporary timing.

A correlator to perform correlation processing in the detecting a temporary timing and a correlator used to perform correlation processing in the detecting a timing are put to a common use.

Still another embodiment of the present invention relates also to a receiving method. This method comprises: receiving a packet signal wherein the packet signal is such that a first data signal is assigned posterior to a first known signal, a second known signal is assigned posterior to the first data signal, and a second data signal is assigned posterior to the second known signal; detecting a temporary timing in a manner such that the presence of the first known signal in the packet signal is detected by performing auto-correlation processing on the first known signal in the packet signal received in the receiving; detecting the presence of the second known signal in the packet signal, by processing the first data in the packet signal at the temporary timing detected in the detecting a temporary timing; detecting a timing by performing cross-correlation processing on between the packet signal received in the receiving and the second known signal when the presence of the second known signal is detected; and processing the second data signal in the packet signal, at the timing detected by the detecting a timing. The window width at the time when the cross-correlation processing is performed in the detecting a timing is set narrower than the window width at the time when the auto-correlation is performed in the detecting a temporary timing.

The receiving also receives another packet signal that contains a first known signal and, in the another packet signal, constellation of part posterior to the first known signal may differ from constellation of at least part of a first data, and when in the packet signal received by the receiving the constellation of part posterior to the first known signal corresponds to the constellation of at lease part of the first data signal, it may be determined that the presence of the second known signal in the packet signal has been detected.

The packet signal received in the receiving is composed of a plurality of streams, and while using as a reference a second known signal assigned to one of a plurality of streams, a cyclic timing shift within the second known signal is applied to a second known signal assigned to other stream, and the detecting a timing may include: deriving, as candidates for timing, a timing corresponding to the second known signal serving as the reference and a timing corresponding to the second known signal to which a timing shift is applied, based on a correlation value; applying a timing shift corresponding to an amount of timing shift, to the second known signal to which a timing shift is applied, among the candidates for timing derived by the deriving; and determining a timing, based on the timing shifted by the applying a timing shift and the timing corresponding to the second known signal serving as the reference among the candidates for timing derived by the deriving.

The determining a timing may be such that either the timing shifted by the applying the timing shift or the timing corresponding to the second known signal serving as the reference among the candidates for timing derived by the deriving, whichever is located anterior to the other, is selected. The receiving method may further comprise storing the packet signal received in memory. When the second data signal in the packet signal is processed at the timing detected in the detecting a timing, the processing the second data signal in the packet signal may be such that the first data signal in the packet signal stored in memory may be processed again.

Data may be composed of a plurality of streams. A known signal may be composed of a plurality of streams. A control signal may be composed of a plurality of streams.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A and 3B illustrate packet formats in the communication system shown in FIG. 2;

DETAILED DESCRIPTION OF THE INVENTION

Figure 1:
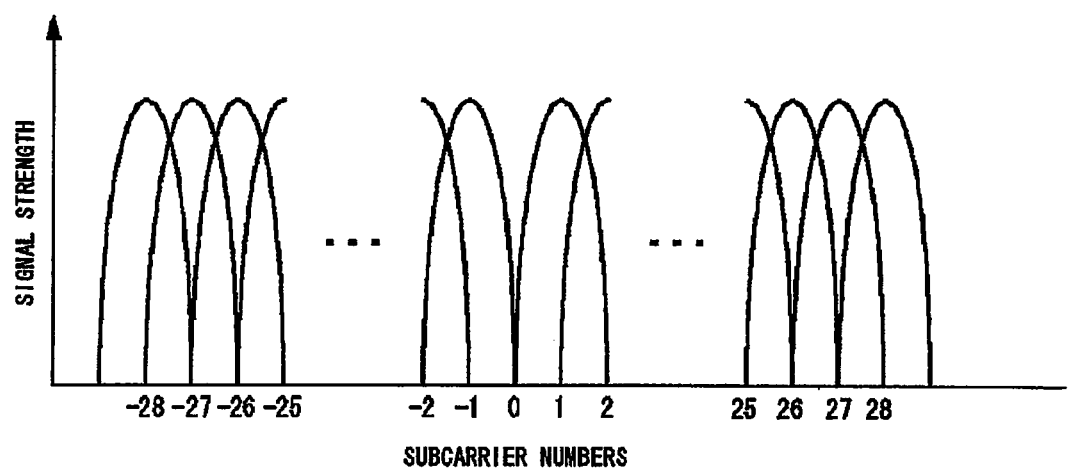
FIG. 1 illustrates a spectrum of a multicarrier signal according to an embodiment of the present invention.

The invention will now be described based on the following embodiments which do not intend to limit the scope of the present invention but exemplify the invention. All of the features and the combinations thereof described in the embodiments are not necessarily essential to the invention.

An outline of the present invention will be given before a concrete description thereof. The embodiments of the present invention relate to a MIMO system comprised of at least two radio apparatuses. One of the radio apparatuses corresponds to a transmitting apparatus whereas the other corresponds to a receiving apparatus. Packet signals are used for the communications in a MIMO system. A known signal compatible with a legacy system (hereinafter referred to as "L-STF") is placed in the header portion of packet signal. A control signal compatible with a MIMO system (hereinafter referred to as "HT-SIG") is placed posterior to L-STF, and a known signal for a MIMO system is placed posterior to HT-SIG. Data is placed posterior to HT-STF. A receiving apparatus performs a cross-correlation processing on between a received packet signal and L-STF, detects the presence of a packet signal and at the same time detects a temporary timing from a correlation value. Here, in order to enhance the accuracy in detecting the presence of a packet signal, the window width at the time of the cross-correlation processing is set to, for example, 800 nsec so that the window width becomes somewhat large.

On the other hand, after HT-STF, the packet signal is defined by a plurality of streams. HT-STFs assigned to streams other than one stream (hereinafter referred to as "reference stream" or "benchmark stream") are defined by patterns in which HT-STF assigned to the standard stream is cyclically timing-shifted. An amount of timing shift is set in a manner such that the amount thereof differs according to a stream. For example, the timing shift amounts set are −400 nsec, −200 nsec and the like. This is equivalent to the fact that a delayed wave is formed beforehand among a plurality of streams. Since the above-mentioned temporary timing is detected while a window width with a large value to a certain degree is used, it corresponds to an average timing. Accordingly, the timing in which the effect from the respective delayed wave components are taken into account is not derived. A receiving apparatus according to the present embodiments derives the timing in the light of the respective delayed wave components, and performs the following processings.

After detecting a temporary timing, the receiving apparatus processes HT-SIG at a temporary timing, so as to detect the presence of HT-STF. While reducing the window width to 400 nsec, for example, the receiving apparatus performs a cross-correlation processing on the received packet signal and HT-STF. As a result, the timing corresponding to a reference stream and the timing to which a timing shift has been applied are derived from the correlation value. The receiving apparatus shifts the latter timing in a posterior direction by the timing shift amount. Further, the receiving apparatus compares the timing corresponding to the reference stream with the thus shifted timing. The receiving apparatus then selects the timing located anteriorly and determines the thus selected timing to be the timing of the packet signal.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. However, it is assumed herein that each subcarrier is designated by a "subcarrier number". In a MIMO system, 56 subcarriers, namely, subcarrier numbers "−28" to "28" are defined. It is to be noted that the subcarrier number "0" is set to null so as to reduce the effect of a direct current component in a baseband signal. On the other hand, 52 subcarriers, namely, subcarrier numbers "−26" to "26" are defined in a legacy system. One example of legacy systems is a wireless LAN complying with the IEEE802.11a standard. The unit of each signal composed of a plurality of subcarriers, which is also the unit of each signal in the time domain, will be called "OFDM symbol".

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to 1/2, 3/4 and so forth. The number of data to be transmitted in parallel is set variably. The data are transmitted as packet signals and each of packet signals to be transmitted in parallel is called "stream" as mentioned earlier. As a result thereof, since the mode of modulation scheme, the coding rate and the number of streams are set variably, the data rate is also set variably. It is to be noted that the "data rates" may be determined by arbitrary combination of these factors or by one of them. If the modulation scheme is BPSK and the coding rate is 1/2 in a legacy system, the data rate will be 6 Mbps. If, on the other hand, the modulation scheme is BPSK and the coding rate is 3/4, the data rate will be 9 Mbps.

Figure 2:
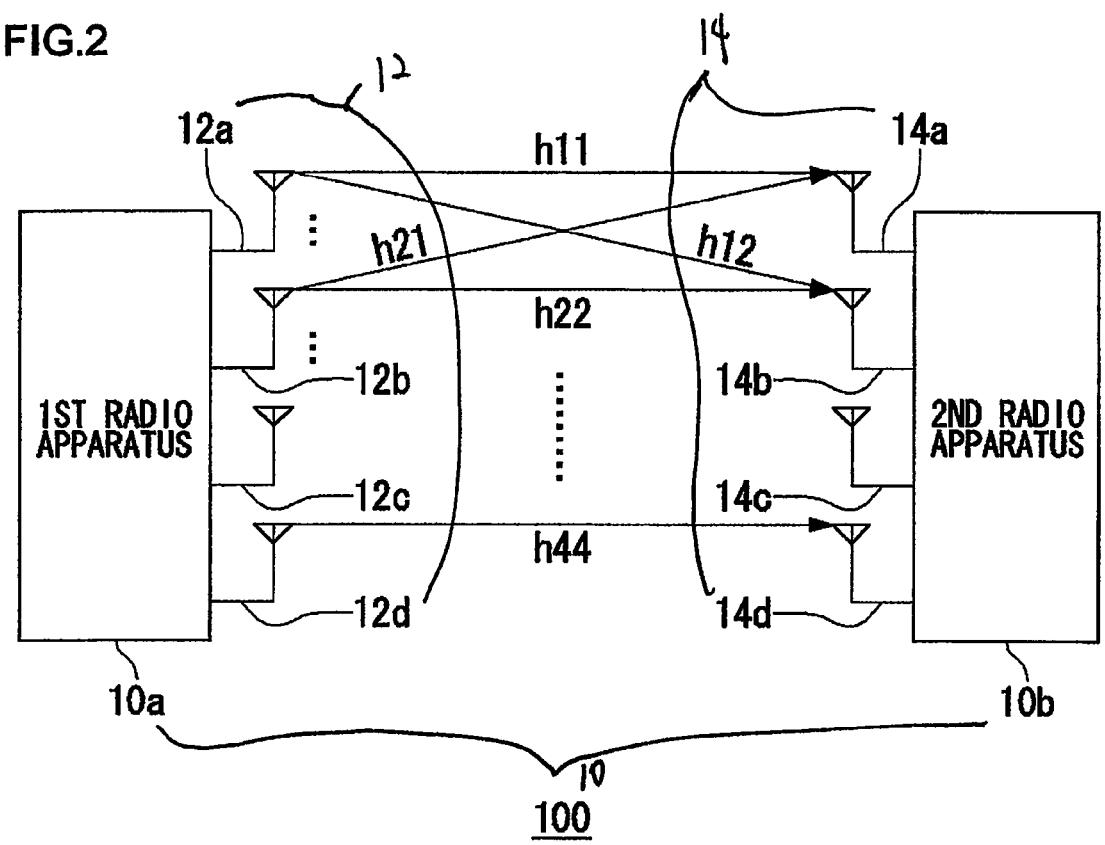
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically referred to as "radio apparatus 10". The first radio apparatus 10a includes a first antenna 12a, a second antenna 12b, a third antenna 12c and a fourth antenna 12d, which are generically referred to as "antennas 12". The second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be explained as the description of a structure of the communication system 100. Assume herein that data are being transmitted from the first radio apparatus 10a to the second radio apparatus 10b. The first radio apparatus 10a transmits respectively the data of multiple streams from the first antenna 12a to the fourth antenna 12d, respectively. As a result, the data rate becomes higher. The second radio apparatus 10b receives the data of multiple streams by the first antenna 14a to the fourth antenna 14d. The second radio apparatus 10b separates the received signals by adaptive array signal processing and demodulates independently the data of multiple streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between the first antenna 12a and the second antenna 14b by $h_{12}$, that between the second antenna 12b and the first antenna 14a by $h_{21}$, that between the second antenna 12b and the second antenna 14b by $h_{22}$, and that between the fourth antenna 12d and the fourth antenna 14d by $h_{44}$. For the clarity of illustration, the other transmission channels are omitted in FIG. 2. Note that the roles of the first radio apparatus 10a and the second radio apparatus 10b may be reversed.

FIGS. 3A and 3B illustrate packet formats in the communication system 100. FIG. 3A corresponds to a packet format defined in a MIMO system, and FIG. 3B corresponds to a packet format defined in a legacy system. In FIG. 3A, data contained in four streams are to be transmitted, and the packet formats corresponding to the first stream to the fourth stream are shown in order from the top to the bottom, respectively. In the packet signal corresponding to the first stream, "L-STF", "HT-LTF" and so forth are assigned as preamble signals. "L-STF", "L-LTF" and "L-SIG" and "HT-SIG" correspond to a known signal for use with timing estimation compatible with a legacy system, a known signal for use with channel estimation compatible with a legacy system, a control signal compatible with a legacy system and a control signal compatible with a MIMO system, respectively. For example, information on the number of streams is contained in the control signal compatible with a MIMO system. "HT-STF" and "HT-LTF" correspond to a known signal for use with timing estimation compatible with a MIMO system and a known signal for use with channel estimation compatible with a MIMO system, respectively. "DATA 1" is a data signal. "L-STF" and "HT-STF" have the same pattern.

In the packet signal corresponding to the second stream, "L-STF (−50 ns)", "HT-LTF (−400 ns)" and so forth are assigned as preamble signals. In the packet signal corresponding to the third stream, "L-STF (−100 ns)", "HT-LTF (−200 ns)" and so forth are assigned as preamble signals. In the packet signal corresponding to the fourth stream, "L-STF (−150 ns)", "HT-LTF (−600 ns)" and so forth are assigned as preamble signals. Here, "−400 ns" and the like indicate an amount of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, a cyclic timing shift with the delayed amount of −50 ns is applied to "L-STF" in "L-STF (−50 ns)".

In the first stream, HT-LFTs are arranged from the top thereof in the order of "HT-LTF", "−HT-LTF", "HT-LTF" and "−HT-LTF". Here, in this order, HT-LTFs are called "first component", "second component", "third component" and "fourth component", respectively, in all of four streams. Desired signal for the first stream are extracted at the receiving apparatus by carrying out an operation of "first component minus (−) second component plus (+) third component minus (−) fourth component" for the received signals of all the streams. By performing an operation of "first component+second component+third component+fourth component" for the received signals of all the streams, desired signals for the second stream are extracted at the receiving apparatus. By performing an operation of "first component−second component−third component+fourth component" for the received signals of all the streams, desired signal for the third stream are extracted at the receiving apparatus. By performing an operation of "first component+second component−third component−fourth component" for the received signals of all the streams, desired signals for the fourth stream are extracted at the receiving apparatus. It is to be noted that the additions and subtractions are done by the vector operation.

The portions from "L-LTF" up to "HT-SIG" use "52" subcarriers in the same way as in a legacy system. Of "52" subcarriers, "4" subcarriers correspond to the pilot signals. On the other hand, the portions corresponding to "HT-LTF" and the like and the subsequent fields use "56" subcarriers. In FIG. 3B, "L-STF", "L-LTF", "L-SIG" are assigned in the same way as in FIG. 3A. "DATA" is further assigned posterior to "L-SIG".

Figure 4:
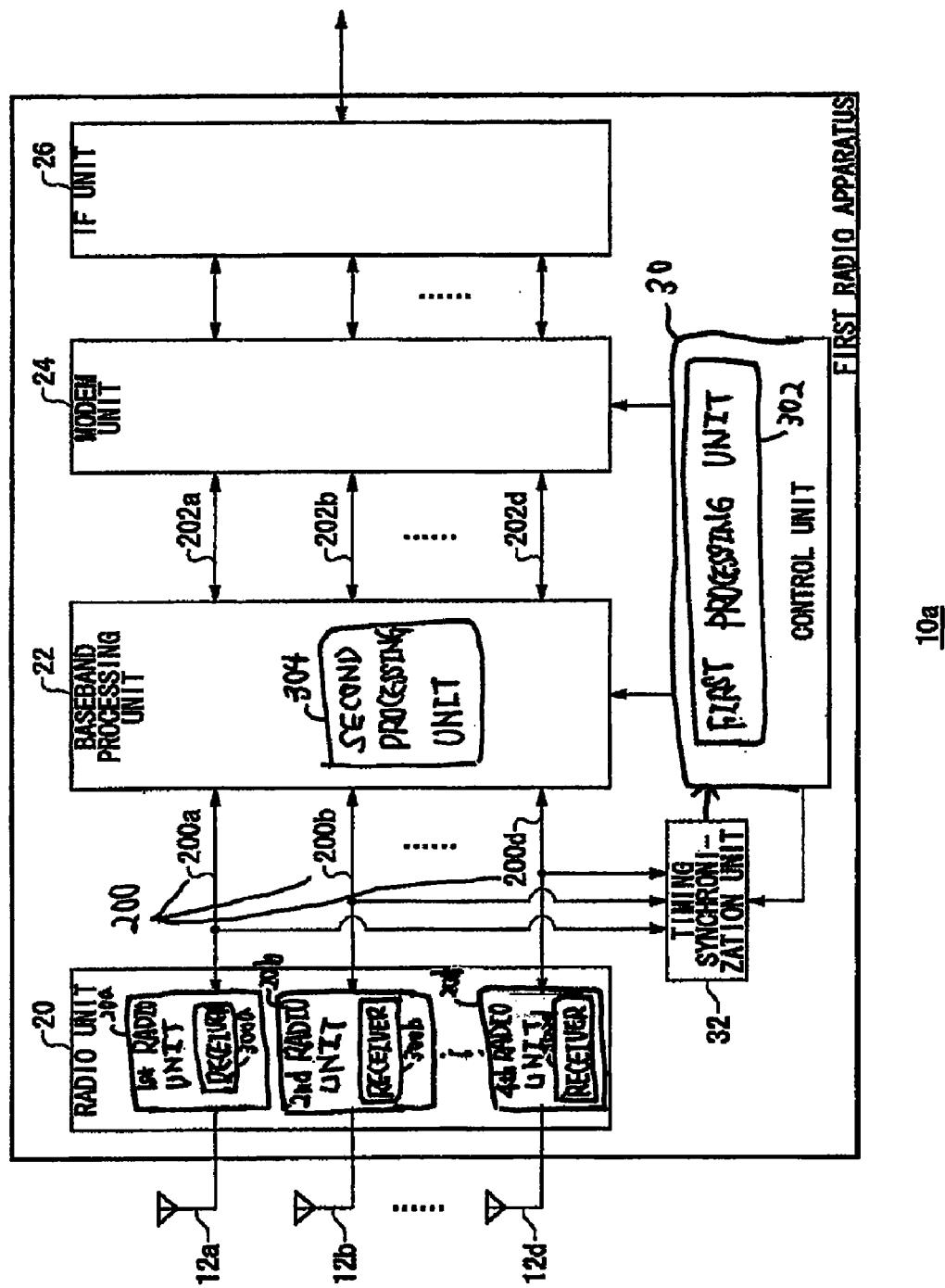
FIG. 4 illustrates a structure of a first radio apparatus shown in FIG. 2.

FIG. 4 illustrates a structure of a first radio apparatus 10a. The first radio apparatus 10a includes a first radio unit 20a, a second radio unit 20b and a fourth radio unit 20d, which are generically referred to as "radio unit 20", a baseband processing unit 22, a modem unit 24, an IF unit 26, a control unit 30 and a timing synchronization unit 32. Signals involved include a first time-domain signal 200a, a second time-domain signal 200b and a fourth time-domain signal 200d, which are generically referred to as "time-domain signal 200", and a first frequency-domain signal 202a, a second frequency-domain signal 202b and a fourth frequency-domain signal 202d, which are generically referred to as "frequency-domain signal 202". The second radio apparatus 10b has a structure similar to that of the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. The AGC unit sets gain in "L-STF" and "HT-STF".

One of the received packet signals in the radio unit 20 is defined by the format shown in FIG. 3A (hereinafter referred to as "MIMO format"). In other words, "HT-SIG" is assigned posterior to "L-STF"; "HT-STF" is assigned posterior to "HT-SIG"; and "DATA 1" or the like is assigned posterior to "HT-STF". A packet signal is composed of a plurality of streams. While the first stream, namely, "HT-STF" assigned to the benchmark stream is used as a reference or benchmark, CDD is applied to "HT-STFs" assigned to other streams. Also, one of the packet signals received in the radio unit 20 is defined by the format shown in FIG. 3B (hereinafter referred to as "legacy format"). In other words, "DATA" is assigned posterior to "L-STF".

Here, the structure up to "L-SIG" is the same in both the MIMO format and the legacy format. On the other hand, "HT-SIG" is assigned immediately after "L-SIG" in the MIMO format, whereas "DATA" is assigned immediately after "L-SIG" in the legacy format. Here, though the details will be described later, the constellation in "DATA" differs from that in "HT-SIG".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. A PA (Power Amplifier) and a D-A conversion unit are also included. It is assumed herein that the time-domain signal 200 is a multicarrier signal converted to the time domain and is a digital signal.

When the received packet signal is of a MIMO format, the timing synchronization unit 32 detects the timing in the separated two stages. Here, for convenience, the timing detected in the first stage is called a temporary timing whereas the timing detected in the second stage is called the timing as it is. For clarity of description, the second-stage processing in the timing synchronization unit 32 will be discussed later. It is to be noted that if the received packet signal is of a legacy format, the first stage only will be executed. As the first-stage processing, the timing synchronization unit 32 performs a correlation processing on the packet signals from the radio unit 20, namely L-STF from among the time-domain signals 200. Here, as a correlation processing, a cross-correlation processing between the time-domain signal and L-STF is performed. It is assumed herein that L-STFs are stored in advance. Furthermore, the timing synchronization unit 32 detects the peak of correlation values and determines the timing corresponding to the peak of the detected correlation values, as the temporary timing.

Note that the timing synchronization unit 32 may perform the above-described processing on one of a plurality of time-domain signals 200 and may also perform it on the plurality of time-domain signals 200, respectively. When the processing is performed on one of the plurality of time-domain signals 200, the one of time-domain signals 200 may be selected fixedly and may also be selected based on the signal strength and the like. In so doing, a measurement unit, which is not shown in the first radio apparatus 10a, will be provided. Also, when the processing is performed on the plurality of time-domain signals 200, respectively, one temporary timing may be selected from among a plurality of derived temporary timings and one temporary timing may also be derived in a manner that a statistical processing such as averaging is performed on the plurality of derived temporary timings. The same as the above-described processing also applies to a processing in the second stage. Here, for simplicity of explanation, it is assumed herein that a correlation processing is performed on one of time-domain signals 200, which is selected fixedly. The timing synchronization unit 32 conveys the thus determined temporary timing to the control unit 30.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. Each frequency-domain signal 202 corresponds to each of a plurality of streams transmitted from the second radio apparatus 10b, not shown here. The baseband processing unit 22 accepts the temporary timing from the control unit 30 in the periods of "L-LTF", "L-SIG" and "HT-SIG" in a MIMO format and in the periods of "L-LTF", "L-SJG" and "DATA" in a legacy format. The baseband processing unit 22 sets a window based on the accepted temporary timing, and executes the conversion into the frequency domain. Here, if Fast Fourier Transform (FFT)is used in the conversion into the frequency domain, the window will correspond to "FFT window."

On the other hand, the baseband processing unit 22 accepts the timing described later, from the control unit 30, in the periods of "HT-LTF", "DATA 1" and so forth in a MIMO format. The baseband processing unit 22 sets a window based on the accepted timing, and executes the conversion into the frequency domain. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals 200 by associating them respectively with a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)" th OFDM symbol is placed after the "i"th OFDM symbol. Note that, in "L-SIG" or the like shown in FIGS. 3A and 3B, a combination of "−26" to "26" is used for one "OFDM symbol".

Now refer back to FIG. 4. The baseband processing unit 22 performs CDD to generate packet signals corresponding to FIG. 3A. CDD is performed as a matrix C expressed by the following Equation (1).

$$C(\lambda)=\mathrm{diag}(1; \exp(-j2\pi\lambda\delta/\mathrm{Nout}),\Lambda, \exp(-j2\pi\lambda\delta(\mathrm{Nout}-1)/\mathrm{Nout})) \quad (1)$$

where δ indicates a shift amount and λ indicates the subcarrier number. The multiplication of C with streams is carried out per subcarrier. That is, the baseband processing unit 22 performs a cyclic timing shift within L-STF or the like on a stream-by-stream basis. The shift amount is set to a different value per stream to correspond to FIG. 3A.

As a receiving processing, the modem unit 24 demodulates and deinterleaves the frequency-domain signal 202 outputted from the baseband processing unit 22. The demodulation is carried out per subcarrier. The modem unit 24 outputs the demodulated signal to the IF unit 26. As a transmission processing, the modem unit 24 carries out interleaving and modulation. The modem unit 24 outputs the modulated signal to the baseband processing unit 22 as a frequency-domain signal 202. When the transmission processing is carried out, the modulation scheme is specified by the control unit 30.

In cooperation with the control unit 30 described later, the modem unit 24 detects the presence of "HT-STF" in the packet signal by demodulating "HT-SIG" in the frequency-domain signal 202 converted in the temporary timing. That is, if, in the packet signal demodulated in the modem unit 24, the constellation in a part posterior to "L-SIG" corresponds to the constellation in "HT-SIG", it is determined by the control unit 30 that the presence of "HT-SIG" has been detected. To explain the above-described operation, a description will now be given of the constellation of "HT-SIG" and the like.

Figure 6A:
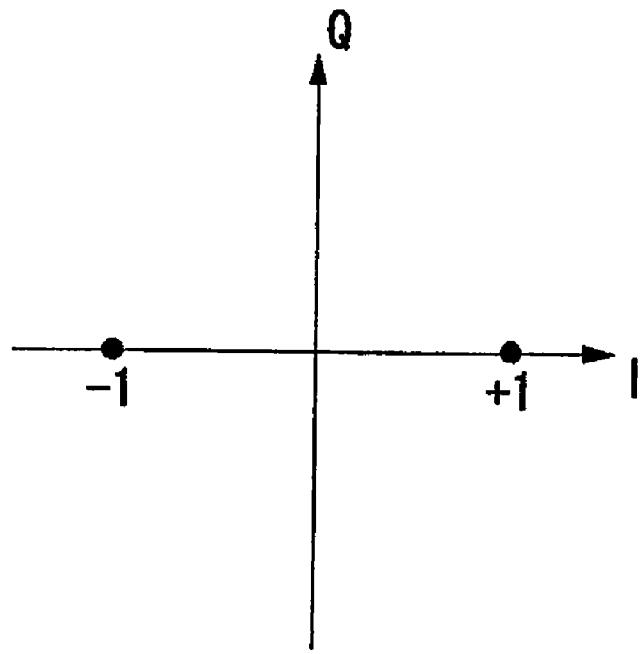
FIGS. 6A and 6B illustrate constellations of L-SIG and HT-SIG shown in FIGS. 3A and 3B.
Figure 6B:
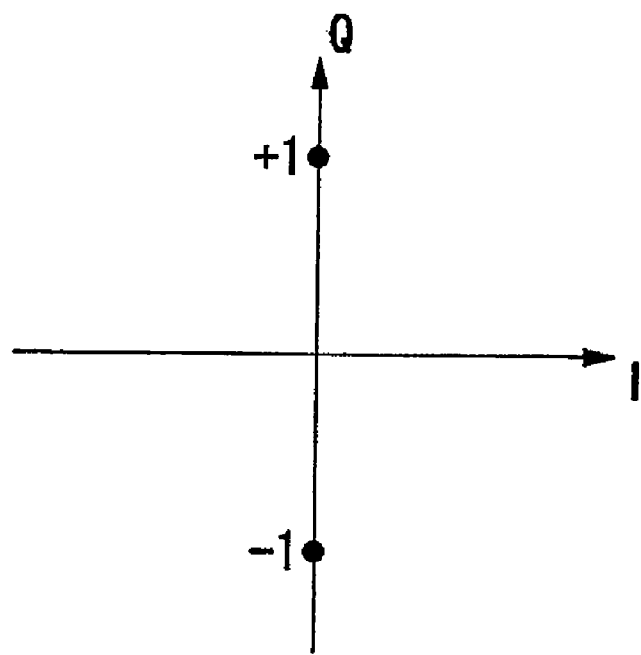

FIGS. 6A and 6B illustrate constellations of L-SIG and HT-SIG. FIG. 6A shows a constellation defined for L-SIG. The horizontal axis indicates an in-phase axis (hereinafter referred to as "I axis") and the vertical axis an quadrature axis (hereinafter referred to as "Q axis"). Referring to FIG. 6A, a signal point is placed on "+1" or "−1" on the I axis. FIG. 6B shows a constellation defined for HT-SIG. Referring to FIG. 6B, a signal point is placed on "+1" or "−1" on the Q axis, and this placement is orthogonal to the constellation defined for L-SIG.

In the MIMO format, HT-SIG is assigned posterior to L-SIG. However, in the legacy format, HT-SIG is not assigned posterior to L-SIG. Accordingly, the control unit 30 specifies, from a change in the constellation of demodulated BPSK, whether HT-SIG is assigned posterior to L-SIG or not. For data in the legacy format, there is a possibility that QPSK and 16-QAM may be used besides BPSK shown in FIG. 6A. In BPSK and 16-QAM, too, the signal point has a predetermined value on the I axis, which differes from FIG. 6B. Thus, the control unit 30 can identify whether HT-SIG is assigned posterior to L-SIG or not, by checking on the value of demodulated signal value on the I axis. If HT-SIG is transmitted, the modulation scheme for the L-SIG part will be BPSK. If the packet signal compatible with a legacy system is received, the modulation scheme of this part should be BPSK and the values of Q components will be small. If, on the other hand, HT-SIG is received, the values of Q components will be large. With this ingenuity, the accuracy in the auto-detection of HT-SIG is raised. Now refer back to FIG. 4.

As a receiving processing, the IF unit 26 combines signals outputted from a plurality of modem units 24 and then forms one data stream. Then the IF unit 26 decodes the one data stream. The IF unit 26 outputs the demodulated data stream. As a transmission processing, the IF unit 26 inputs one data stream, encodes it and then separates it. Then the IF unit 26 outputs the thus separated data to the plurality of modem units 24. It is assumed that the coding rate is identified by the control unit 30 at the time of transmission processing. Here, an example of the coding is convolutional coding, whereas an example of decoding is Viterbi decoding.

The control unit 30 controls the timing and the like of the first radio apparatus 10a. When the control unit 30 receives a temporary timing from the timing synchronization unit 32, the control unit 30 conveys the temporary timing to the baseband processing unit 22 and the modem unit 24. As described above, the control unit 30 detects whether "HT-SIG" is present in the packet signal or not, based on the signal demodulated in the modem unit 24. If the presence of "HT-SIG" is detected in the packet signal, the control unit 30 will instruct the timing synchronization unit 32 to perform a correlation processing on "HT-STF" among the time-domain signals 200. Upon receipt of the instruction, the timing synchronization unit 32 detects the timing by performing the cross-correlation processing on the time-domain signals from the radio unit 20 and HT-STF. The detail of the timing detection will be described later.

The control unit 30 instructs the timing synchronization unit 32 such that the window width at the time when the timing synchronization unit 32 performs the cross-correlation processing with "HT-STF" is narrower than the window width at the time when it performs the cross-correlation processing with "L-STF". Upon receipt of the timing detected by the timing synchronization unit 32, the control unit 30 conveys the timing to the baseband processing unit 22 and the modem unit 24. The baseband processing unit 22 processes "HT-LTF", "DATA 1" and the like in the packet signal.

In terms of hardware, this structure can be realized by a CPU, a memory and other LSIs of an arbitrary computer. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 7:
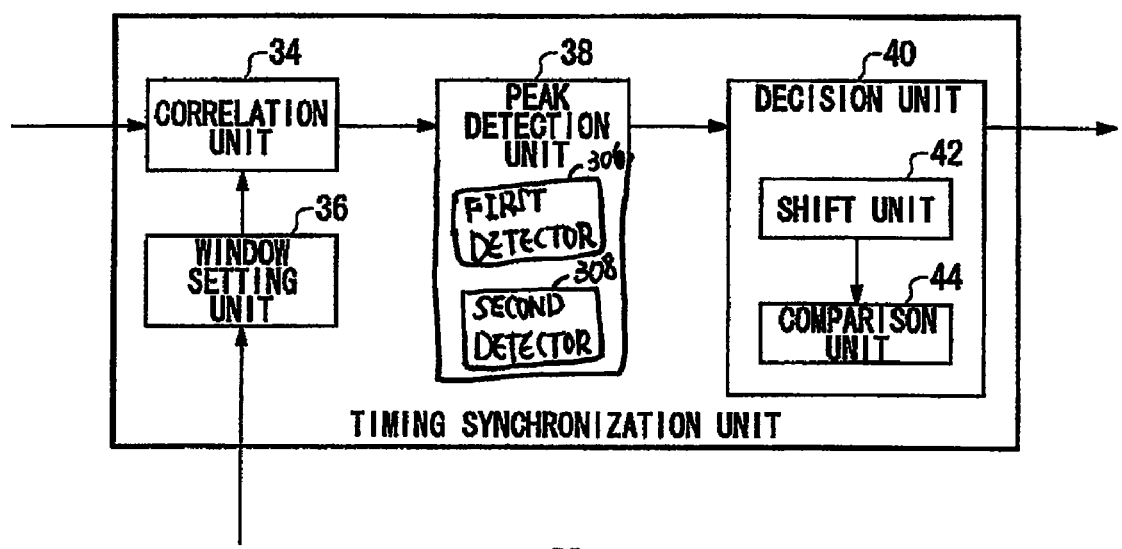
FIG. 7 illustrates a structure of a timing synchronization unit of FIG. 4.

FIG. 7 illustrates a structure of a timing synchronization unit. The timing synchronization unit 32 includes a correlation unit 34, a window setting unit 36, a peak detection unit 38 and a decision unit 40. The decision unit 40 includes a shift unit 42 and a comparison unit 44.

The correlation unit 34 inputs each time-domain signal 200, and performs a cross-correlation processing between the time-domain signal 200 and L-STS (hereinafter referred to as "first stage") and a cross-correlation processing between the time-domain signal 200 and H-LTF (hereinafter referred to as "second stage") The window width at the time when the cross-correlation processing is performed is set by the window setting unit 36. The window setting unit 36 receives instructions on the window width from the control unit 30 (not shown in FIG. 7) so as to set the window width of the correlation unit 34. As described above, in a header portion of the packet signal, namely in the first stage, the window setting unit 36 sets a comparatively longer window width. In the second stage, the window setting unit 36 sets a shorter window width. In this manner, the correlation processing in the first stage and the correlation processing in the second processing are performed in the correlation unit 34. In other words, a single correlator is used commonly both for the first stage and the second stage. As a result, the increase in circuit scale due to the correlators can be reduced. Note that the same pattern, namely, the same waveform is used for L-STF and HT-STF.

Figure 8:
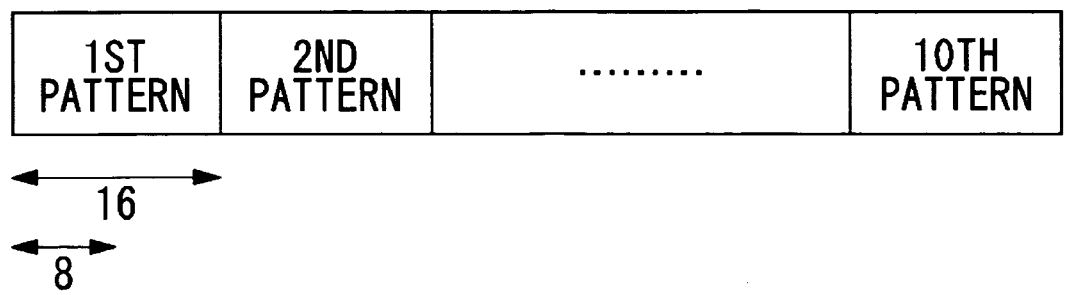
FIG. 8 illustrates formats of L-STF and HT-STF in FIGS. 3A and 3B.

FIG. 8 illustrates formats of L-STF and HT-STF. L-STF is composed of a first pattern to a tenth pattern which are ten patterns in total. Each pattern is constituted by sixteen components. Note that the ten patterns are composed of the same patterns. In other words, one pattern comprised of sixteen components is repeated ten times. On the other hand, in HT-STF one pattern is repeated five times.

Figure 9:
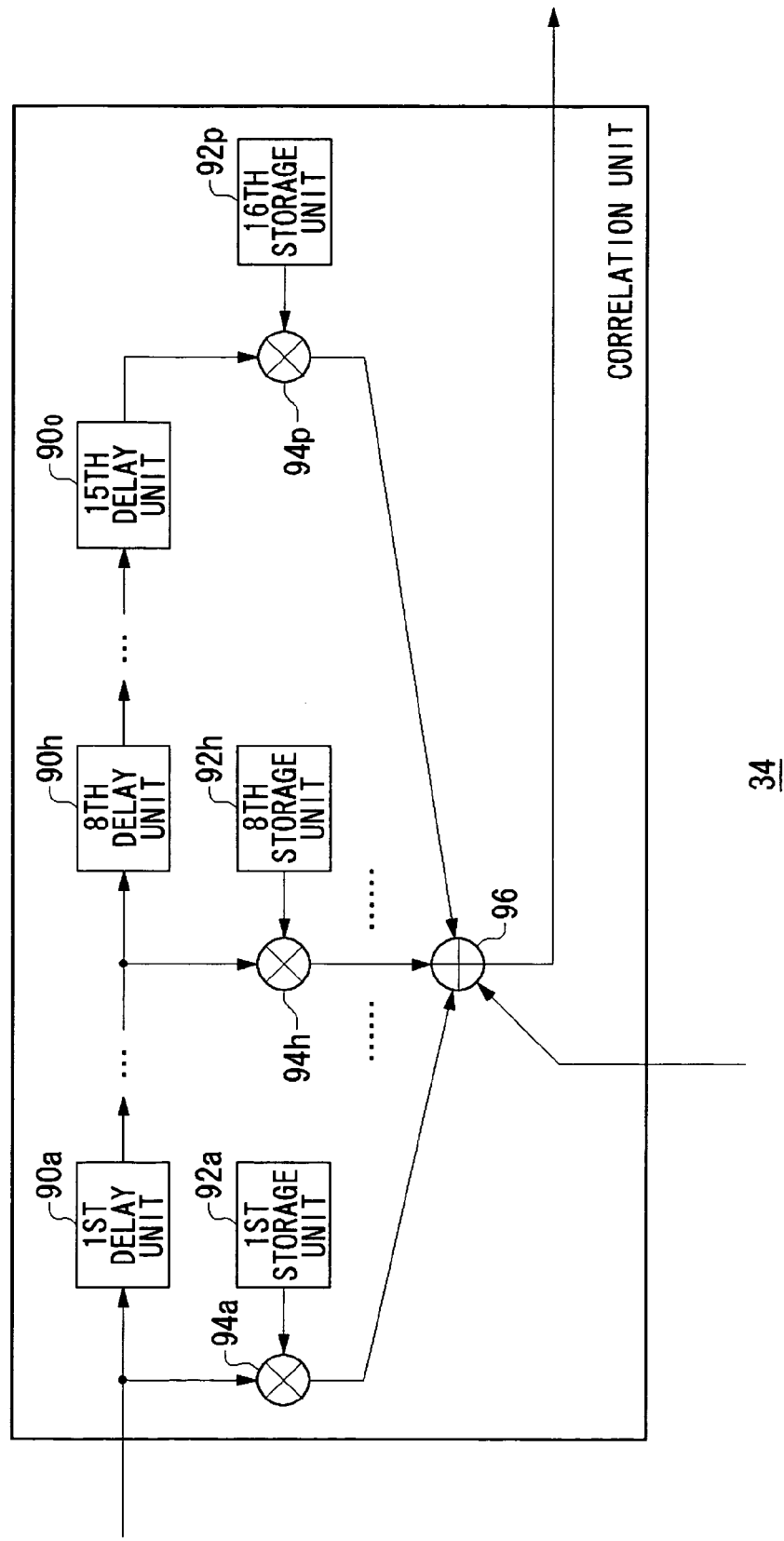
FIG. 9 illustrates a structure of a correlation unit in FIG. 7.

FIG. 9 illustrates a structure of a correlation unit 34. The correlation unit 34 includes a first delay unit 90a, . . . an eighth delay unit 90h, . . . and a fifteenth delay unit 90o, which are generically referred to as "delay unit 90", a first storage unit 92a, . . . , an eighth storage unit 92h, . . . and a sixteenth storage unit 92p, which are generically referred to as "storage unit 92", a first multiplier 94a, . . . , an eighth multiplier 94h, . . . and a sixteenth multiplier 94p, which are generically referred to as "multiplier 94", and an adder 96.

As shown in FIG. 9, the correlation unit 34 has a structure of a matched filter, and generates correlation values. The delay unit 90 sequentially delays the inputted time-domain signal 200. The storage unit 92 stores the patterns of L-STF, namely, the waveforms thereof. Here, the sixteen components contained in the above-described each pattern are stored in the first storage unit 92a to the sixteenth storage unit 92p. The multiplier 94 multiplies the inputted time-domain signal 200 and the time-domain signal 200 from the delay unit by the patterns stored in the storage unit 92. The adder 96 adds up the multiplication results in the multiplier 94 so as to sequentially generate the correlation values.

Here, in the first stage, the adder 96 adds up the multiplication result of the first multiplier 94a to the multiplication result of the sixteenth multiplier 94p. That is, the adder 96 sums up sixteen multiplication results. Accordingly, the "comparatively longer window width" is defined as the number of components contained in one pattern. On the other hand, in the second stage, the adder 96 adds up the multiplication results of the first multiplier 94a to the eighth multiplier 94h. That is, the adder 96 sums up eight multiplication results. Here, the window width composed of eight components corresponds to the absolute value "400 ns" of a shift amount in FIG. 3A. If the absolute value "200 ns" of a shift amount in FIG. 3A is considered, the adder 96 may add up four multiplication results. Accordingly, the "shorter widow width" is a number which is smaller than the number of components contained in one pattern, and is so defined as to be able to separate the delayed wave component generated by CDD.

Figure 10A:
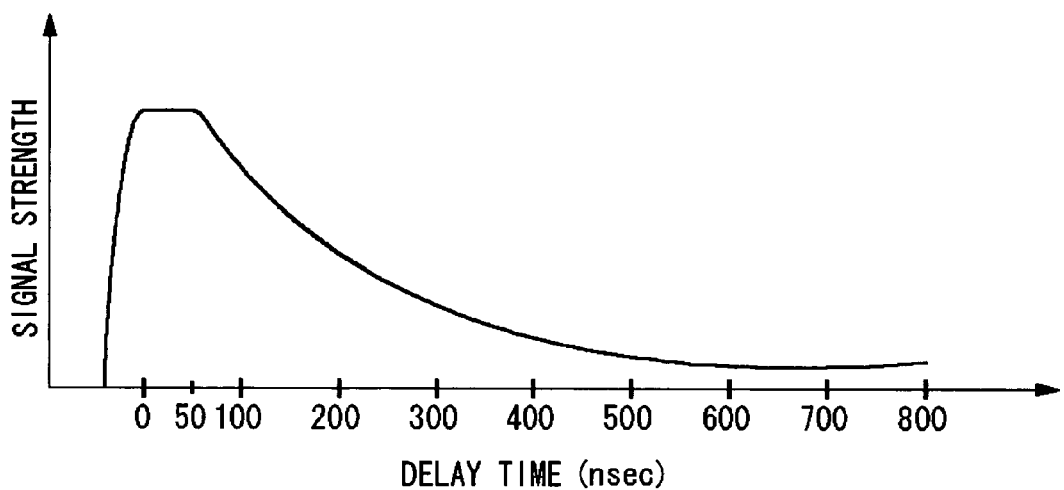
FIGS. 10A and 10B illustrate delay profiles of signals inputted to a correlation unit of FIG. 9.
Figure 10B:
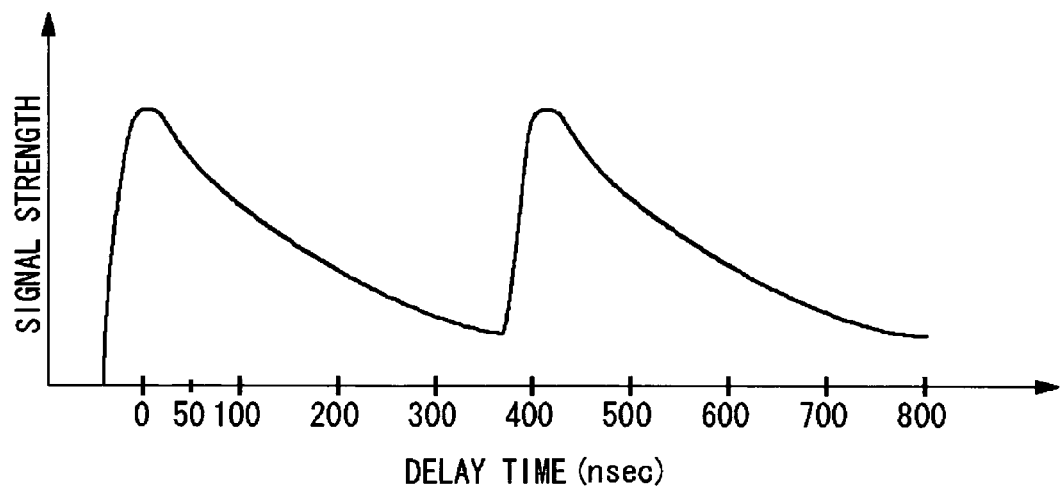

FIGS. 10A and 10B each shows a delay profile of signals inputted to the correlation unit 34. It is assumed herein that a packet signal is composed of two streams. FIG. 10A shows a delay profile in the first stage. The horizontal axis represents delay time and the vertical axis represents the signal strength. The delay time of a preceding wave is set to "0 ns". In FIG. 10A, L-STF in the first stream and L-STF in the second stream are combined directly. Hence, when the delay time thereof is in the neighborhood of 0 to 50 ns, the signal strength will be large. Accordingly, when the delay time is in the neighborhood of 0 to 50 nsec, the correlation value derived in the correlation unit 34 becomes maximum. However, depending on the channel characteristics there are cases where these L-STFs are so combined as to cancel each other. In such a case, the signal strength in which the delay time lies in the range of 0 to 50 nsec gets small, so that the effect of the signal strength in the delay time of from 50 nsec onward becomes relatively large. Accordingly, as the delay time becomes larger than 50 nsec, the correlation value derived in the correlation unit 34 will also become large. In response to this, as was described earlier, the window width in the first stage is so defined as to become the length of one pattern.

FIG. 10B shows a delay profile in the second stage. Since L-STF in the first stream and L-STF in the second stream are combined directly in FIG. 10B, the signal strength becomes large when the delay time is in the neighborhood of 0 nsec to 400 nsec. If the window width in the first stage is set to the signal of such a delay profile, the correlation value will also become large at the timing when the delay time is in the range of 0 nsec to 400 nsec. That is, two peaks of the delay profile cannot be separated. Accordingly, in the second stage, the window width is so defined as to be the half of a pattern. Now, refer back to FIG. 7.

The peak detection unit 38 detects the peak of correlation values from the correlation unit 34. In the first stage, the peak detection unit 38 detects a peak. It is to be noted that the peak detection unit 38 has set a threshold value in advance and when the correlation value of peak exceeds the threshold value, the presence of L-STF is detected. If the presence of L-STF is detected, the peak detection unit 38 will convey the then timing to the decision unit 40. When the correlation value of peak does not exceed the threshold value, the peak detection unit 38 continues to detect the peak.

On the other hand, in the second stage the peak detection unit 38 detects the peaks corresponding to the delay time of 0 nsec, −400 nsec, −200 nsec and −600 nsec. These correspond to the time shift amounts in CDD applied to HT-STFs. In other words, based on the correlation values the peak detection unit 38 detects the timing corresponding to HT-STF in the first stream and the timing corresponding to HT-STF in the second stream to the fourth stream, as candidates for the timing. The peak detection unit 38 carries out the detection of delay time in the order of 0 nsec, −400 nsec, −200 nsec and −600 nsec. That is, when a peak is detected in the neighborhood of the delay time of −200 nsec, the peak detection unit 38 detects a peak in the neighborhood of −600 nsec. However when a peak is not detected in the neighborhood of the delay time of −200 nsec, the peak detection unit 38 does not detect a peak in the neighborhood of −600 nsec. In such a case, the number of streams is identified as "2". The peak detection unit 38 conveys the candidates for the detected timing to the decision unit 40.

When in the first stage the decision unit 40 receives the timing from the peak detection unit 38, it conveys said timing to a control unit 30 (not shown in FIG. 7) as a temporary timing. On the other hand, in the second stage the decision unit 40 receives candidates for the timing from the peak detection unit 38. While using the shift unit 42 and the comparison unit 44, the decision unit 40 selects a timing from the candidates for the timing and conveys the thus selected timing to the control unit 30.

The shift unit 42 shifts the timings of the candidates for the timing, respectively. The shift unit 42 shifts the timing, among the candidates for the timing, corresponding to HT-STF to which the timing shift has been applied, by the timing shift amount. For example, the shift unit 42 selects the timing, out of the candidates for the timing, corresponding to the delay amount of −400 nsec and shifts the selected timing in a posterior direction by 400 nsec. Also, the shift unit 42 selects the timing, out of the candidates for the timing, corresponding to the delay amount of −200 nsec and shifts the selected timing in a posterior direction by 200 nsec. The shift unit 42 performs the similar processing on the timing corresponding to the delay amount of −600 nsec. By performing the above processing, the shift unit 42 puts the timing corresponding to HT-STF to which the timing shift has been applied and the timing corresponding to the first stream into a state where they can be compared.

The comparison unit 44 determines the timing based on the timing shifted by the shift unit 42 and the timing corresponding to the first stream. Here, either the timing shifted by the shift unit 42 or the timing corresponding to the first stream is selected whichever exists in the anterior position. If the timing that exists in the posterior position is selected, one OFDM symbol identified by said timing will be the OFDM symbol that follows it and may overlap with the actual OFDM symbol. In such a case, the interference occurs between the OFDM symbols, so that the receiving characteristic is likely to deteriorate. In order to prevent the deterioration like this, the comparison unit 44 selects the timing that exists in the foremost position.

Figure 11A:
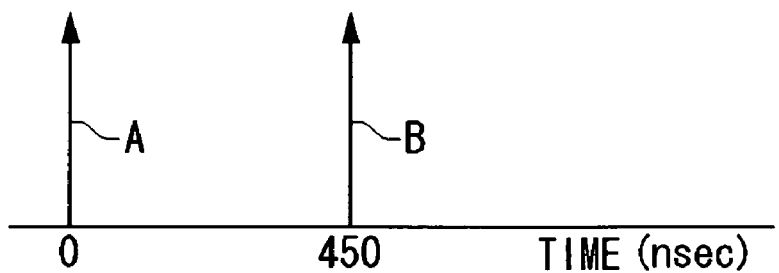
FIGS. 11A to 11D illustrate an outline of a timing decision in a decision unit of FIG. 7.

FIGS. 11A to 11D illustrate an outline of a timing decision in a decision unit 40. For clarity of explanation, a description will be given here of a case where the timing corresponding to HT-STF in the first stream and the timing corresponding to HT-STF in the second stream are detected as the candidates for the timing. The horizontal axes of FIGS. 11A to 11D indicate time, and the arrows indicate timings. FIG. 11A illustrates two timings detected in the peak detection unit 38. Here, "A" is equivalent to the timing corresponding to HT-STF in the second stream and "B" the timing corresponding to HT-STF in the first stream. Note that "B" is detected at the timing of 450 nsec.

Figure 11B:
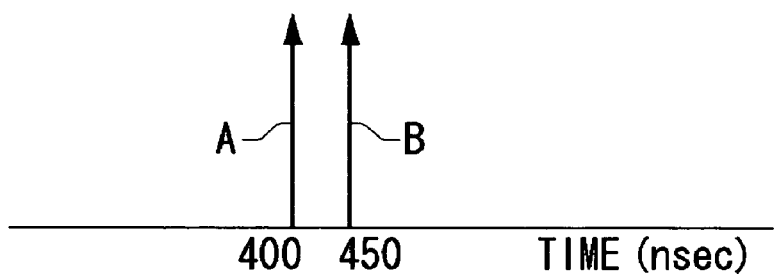

FIG. 11B illustrate a case where "A" of FIG. 11A is shifted in a posterior direction by 400 nsec. With this shift, "A" is now positioned at the timing of 400 nsec. The comparison unit 44 compares "A" positioned at the timing of 400 nsec with "B" positioned at the timing of 450 nsec, and selects the timing that exists in an anterior position. Thus, "A" is selected here. Then the decision unit 40 conveys the selected timing to a control unit 30 (not shown in FIG. 7).

Figure 11C:
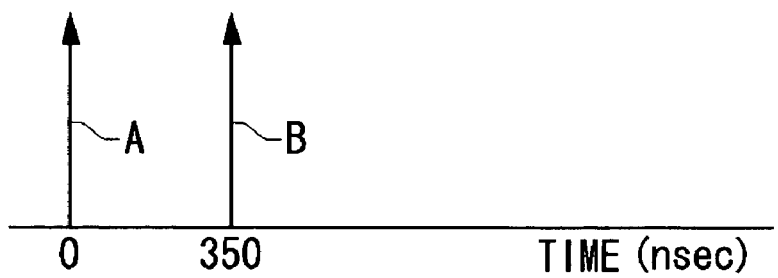
Figure 11D:
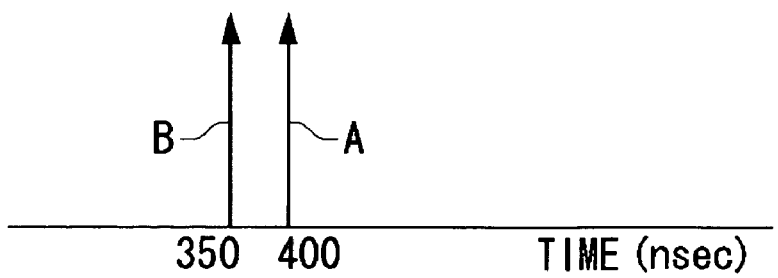

Similar to FIG. 11A, FIG. 11C illustrates two candidates for the time detected by the peak detection unit 38. In FIG. 11C, on the other hand, "B" is detected at the timing of 350 nsec. FIG. 11D shows a case where "A" of FIG. 11C is shifted, by the shift unit 42, to a posterior position by 400 nsec. With this shift, "A" is positioned at the timing of 400 nsec. The comparison unit 44 compares "A" positioned at the timing of 400 nsec with "B" positioned at the timing of 350 nsec, and selects the timing "B" that exists in an anterior position. Then the decision unit 40 conveys the selected timing to the control unit 30 (not shown in FIG. 7). For clarity of explanation, it was assumed here that "A" exists at the timing of 0 nsec. However, "A" may exist actually in other timing.

Figure 12:
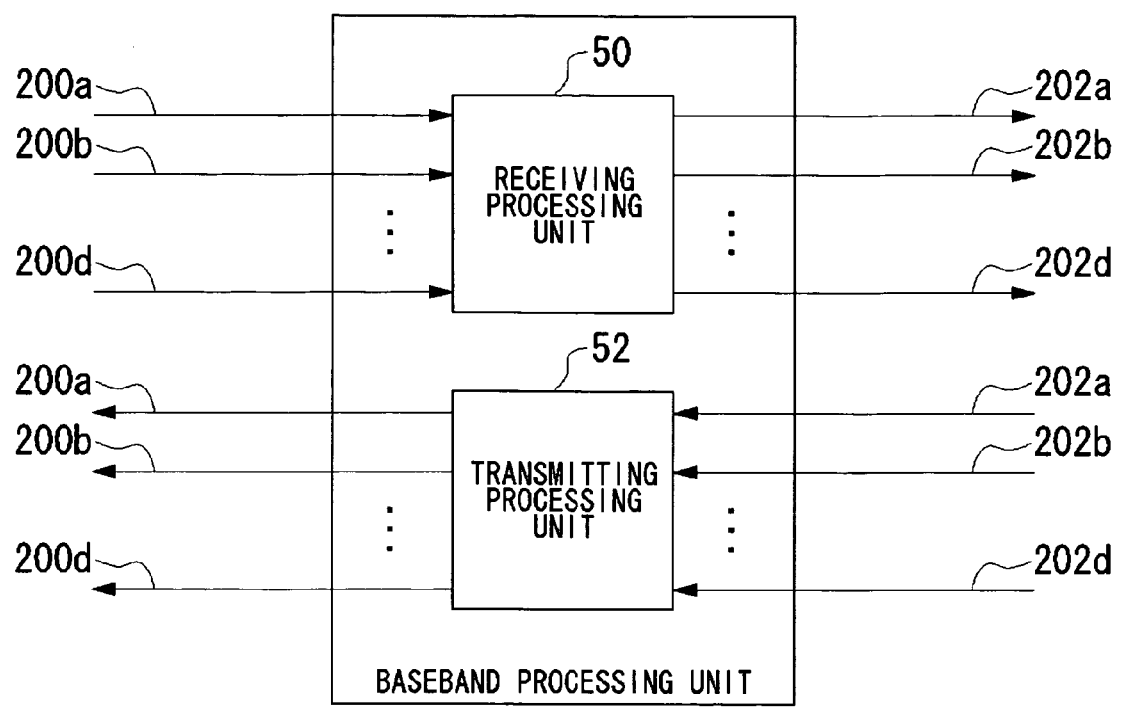
FIG. 12 illustrates a structure of a baseband processing unit shown in FIG. 4.

FIG. 12 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and, for that purpose, derives receiving weight vectors in the time domain. Then the receiving processing unit 50 outputs the result of array synthesis as the frequency-domain signal 202.

The transmitting processing unit 52 executes a part, corresponding to a transmission operation, of operations by the baseband processing unit 22. That is, the transmitting processing unit 52 converts the frequency-domain signals 202 so as to generate the time-domain signals 200. The transmitting processing unit 52 associates a plurality of streams respectively with a plurality of antennas 12. The transmitting processing unit 52 also executes CDD as shown in FIG. 3A. Finally, the transmitting processing unit 52 outputs the time-domain signals 200.

Figure 13:
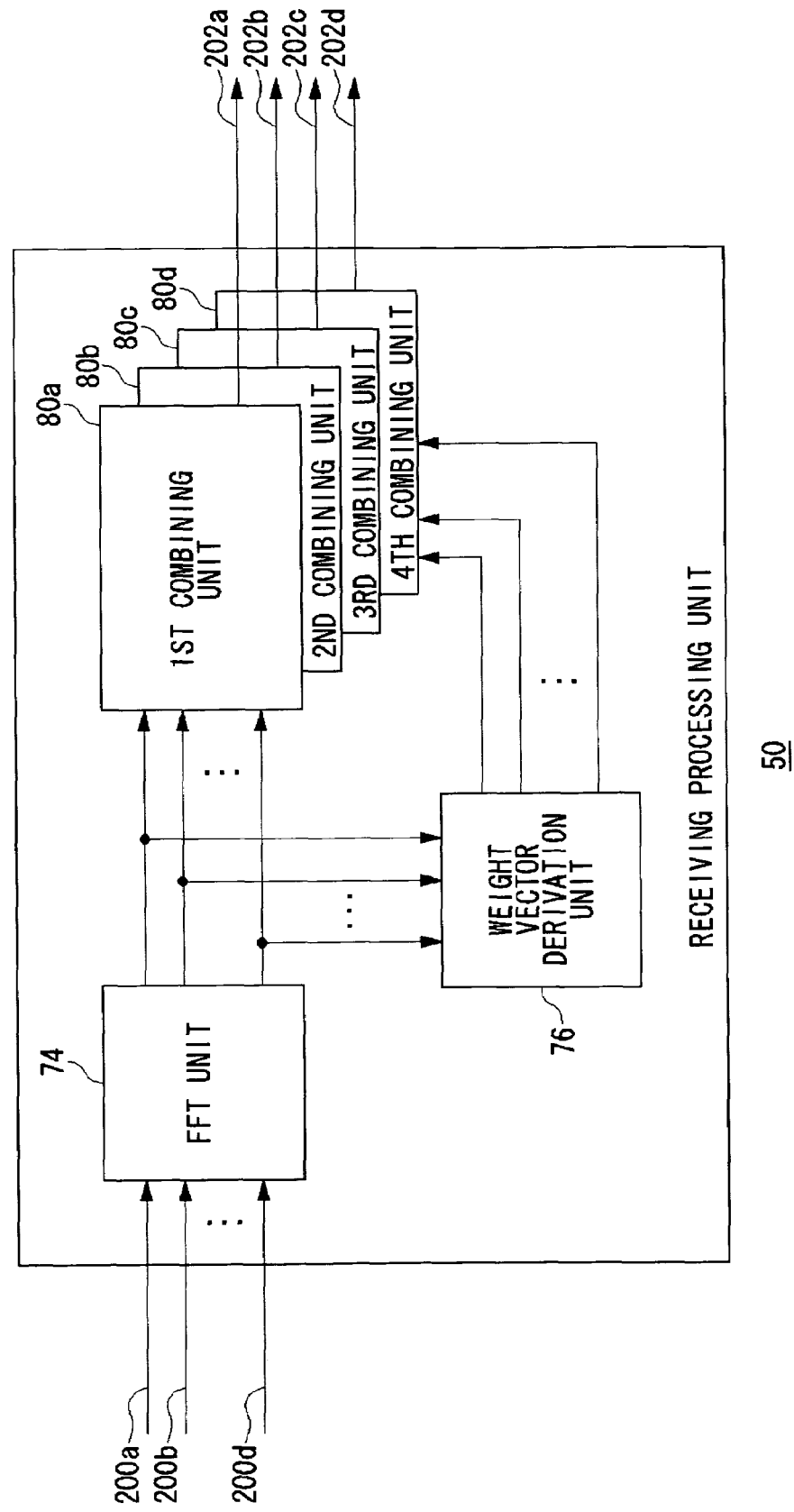
FIG. 13 illustrates a structure of a receiving processing unit shown in FIG. 12.

FIG. 13 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 5. That is, a frequency-domain value for one time-domain signal 200 is outputted via one signal line. The FFT unit 74 performs FFT on "L-LTF", "L-SIG" and "HT-SIG" of FIG. 3A, based on an FFT window set at a temporary timing. On the other hand, the FFT unit 74 performs FFT on "HT-LTF", "DATA 1" and the like of FIG. 3A, based on an FFT window set at timings. Also, the FFT unit 74 performs FFT on "L-LTF", "L-SIG" and "DATA" of FIG. 3B, based on an FFT window set at a temporary timing.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. HT-LTF and the like are used to derive a weight vector corresponding to each of a plurality of streams. To derive the weight vector, an adaptive algorithm may be used or a channel characteristics may be used. Since a known technique may be employed in such processing, the explanation thereof is omitted here. As described earlier, when deriving the weights, the weight vector derivation unit 76 carries out an operation of "the first component−the second component+the third component−the fourth component". As described earlier, the weights are finally derived per subcarrier, per antenna 12 and per stream.

The combining unit 80 combines the frequency-domain value converted by the FFT unit 74 with the weight vector from the weight vector derivation unit 76. For example, as the weight vector to which a multiplication is to be executed, a weight which corresponds to both one subcarrier 4 and the first stream is selected from among the weight vectors from the weight vector derivation unit 76. The selected weight has a value corresponding to each antenna 12.

As another value to which a multiplication is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied together and the multiplication results are summed up. As a result, a value corresponding to one subcarrier in the first stream is derived. In the first combining unit 80a, the above-described processing is performed on the other subcarriers so as to derive data corresponding to the first stream. The second combining unit 80*b* to the fourth combining unit 80*d* carries out the similar processing so as to derive data corresponding respectively to the second to fourth streams. The derived first to fourth streams are outputted as the first frequency-domain signal 202*a* to the fourth frequency-domain signal 202*d*, respectively.

Figure 14:
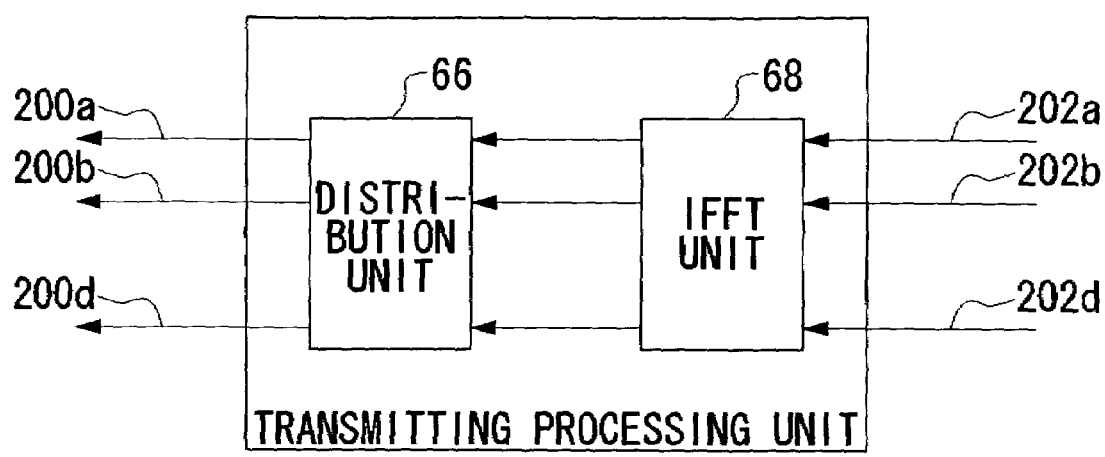
FIG. 14 illustrates a structure of a transmitting processing unit shown in FIG. 12.

FIG. 14 illustrates a structure of the transmitting processing unit 52. The transmitting processing unit 52 includes a distribution unit 66 and an Inverse Fast Fourier Transform (IFFT) unit 68. Note that the IFFT unit 68 may be placed posterior to the distribution unit 66. The IFFT unit 68 performs IFFT on the frequency-domain signals 202 and then outputs time-domain signals. As a result thereof, the IFFT unit 68 outputs the time-domain signal corresponding to each stream.

The distribution unit 66 associates the streams from the IFFT unit 68 with the antennas 12. Since it is assumed here that the number of antennas 12 used is identical to the number of streams, each stream is directly associated with each antenna 12. The distribution unit 66 applies CDD to the streams to be transmitted, namely, "L-SIG" and the like among the respective packet signals.

Figure 15:
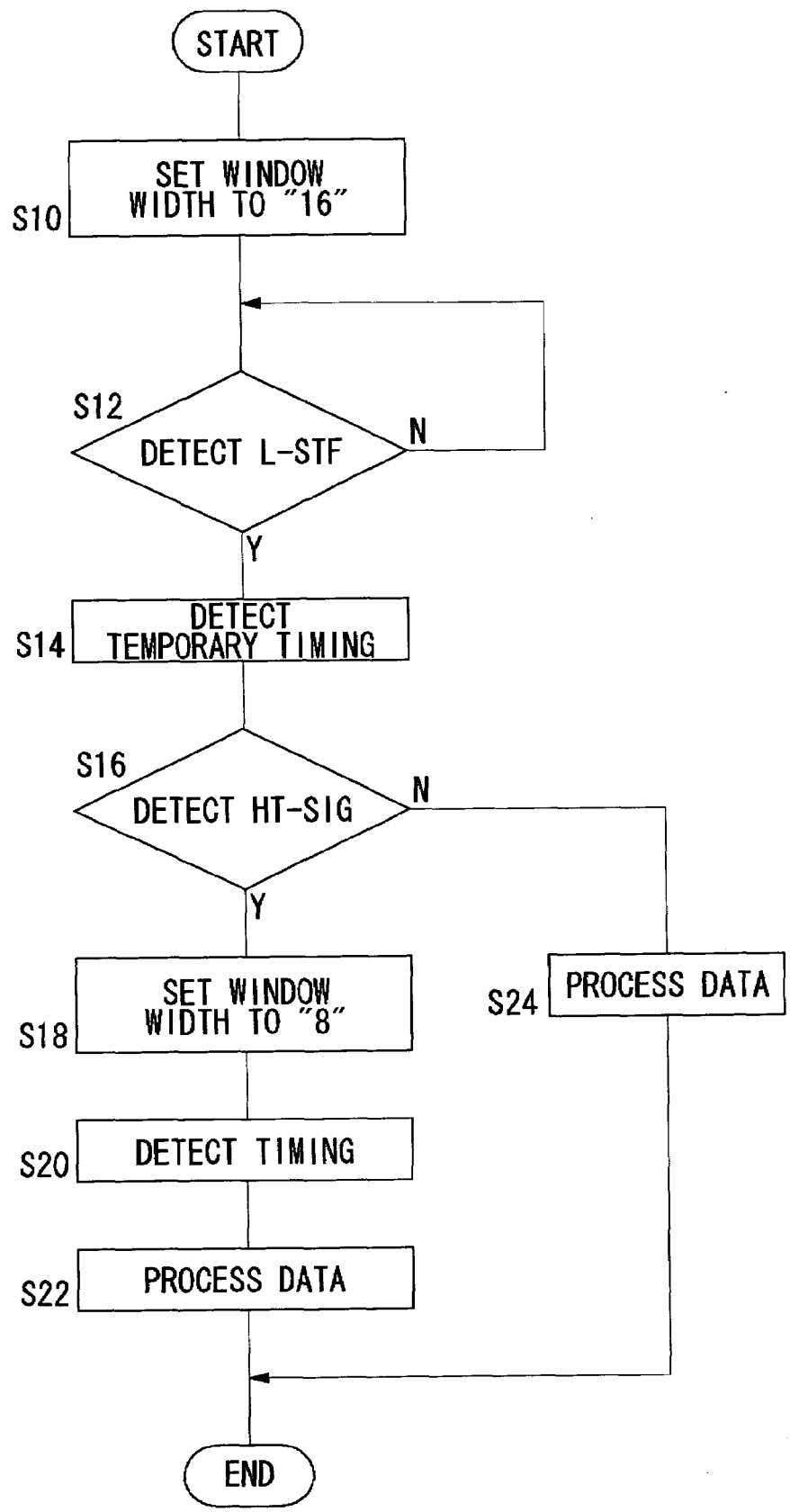
FIG. 15 is a flowchart showing a procedure of a timing synchronization processing in a timing synchronization unit in FIG. 6.

An operation of the radio apparatus 10 structured as above will now be described. FIG. 15 is a flowchart showing a procedure of a timing synchronization processing in a timing synchronization unit 32. Based on an instruction from the control unit 30, the window setting unit 36 sets the window width of the correlation unit 34 to "16" (S10). If the peak detection unit 38 detects "L-STF" with a result that the correlation processing has been performed by the correlation unit 34 under such window width like this (Y of S12), the decision unit 40 will detect a temporary timing (S14). If, on the other hand, the peak detection unit 38 does not detect "L-STF" (N of S12), the correlation processing will be repeatedly performed.

If the control unit 30 detects "HT-SIG" as a result of demodulation by the modem unit 24 (Y of S16), the window setting unit 36 will set the window width to "8" based on an instruction from the control unit 30 (S18). With a result that the correlation has been performed by the correlation unit 34 under the window width like this, the peak detection unit 38 and the decision unit 40 will detect the timing (S20). The baseband processing unit 22 and the modem unit 24 process data, based on the detected timing (S22). If, on the other hand, the control unit 30 does not detect "HT-SIG" (N of S16), the baseband processing unit 22 and the modem unit 24 will process data, based on the detected temporary timing (S24).

According to an embodiment of the present invention, the window width at the time the correlation processing is performed in the second stage is so set as to be narrower than the window width at the time the correlation processing is performed in the first stage. Thereby, L-STF can be detected with high probability in the first stage and the timing can be detected with high accuracy in the second stage. Also, the window width at the time when the correlation processing is performed in the first stage is set to larger width. Hence, even if the streams arriving at a header portion due to the effect of channel characteristics mutually cancel each other, streams arriving in a posterior part can be detected, so that L-STF can be detected with high probability. Also, since L-STF is detected with high probability, signals that follow L-STF can be processed reliably.

Moreover, the window width at the time when the correlation processing is performed in the second stage is set to smaller width, a plurality of streams that constitute the received packet signal can be separated. Since the plurality of streams are separated, the timings corresponding respectively to the plurality of streams can be detected. Since a correlation unit each used in two correlation processings in the first stage and the second stage can be put a common use, the increase in circuit scale can be prevented and actually the total circuit size can be reduced. Since the cross-correlation is employed as the two correlation processings, the effect of noise can be reduced and the accuracy in the detection of peak of correlation values can be enhanced. Since the accuracy in the detection of peak of correlation values can be enhanced, the accuracy of detecting the temporary timing and the timing can be improved. Since the presence of HT-SIG is detected according to the constellation, it can be automatically detected. Since it can be automatically detected, additional signals by which to inform the presence are no longer necessary. Thus, the deterioration of transmission efficiency can be prevented.

Detecting the presence of HT-SIG identifies whether the packet signal is a MIMO format or a legacy format. Since a timing is determined from the timings corresponding respectively to a plurality of streams, the effects of the plurality of respective streams can be taken into consideration, the timing can be detected with high accuracy. Since the timing that exists in an anterior position is selected from among a plurality of timings, the interference with OFDM symbols assigned to a posterior positions can be reduced and therefore the receiving characteristics can be enhanced.

The present invention has been described based on the embodiments. These embodiments are merely exemplary, and it is understood by those skilled in the art that various modifications to the combination of each component and process thereof are possible and that such modifications are also within the scope of the present invention.

In an embodiment of the present invention, the correlation unit 34 performs cross-correlation processing both in the first stage and the second stage. However, this should not be considered as limiting and, for example, the correlation unit 34 may perform auto-correlation processing in the first stage and perform cross-correlation processing in the second stage. In such a case, it is preferred that the storage unit 92 store the time-domain signals 200 which have been received beforehand. In such a structure, too, the window setting unit 36 sets the window width in a manner that the window width in the second stage is narrower than the window width in the first stage. Also, the correlation unit 34 may perform auto-correlation processing both in the first stage and second stage. According to this modification, the probability of detecting L-STF in the first stage can be raised. That is, it suffices as long as the cross-correlation processing is performed using the window width narrower than that in the first stage.

In an embodiment of the present invention, after the timing has been detected by the timing synchronization unit 32, the baseband processing unit 22 and the modem unit 24 performs receiving processing on "HT-LTF", "DATA 1" and the like, based on said timing. However, this should not be considered as limiting and, for example, after the timing has been detected, the baseband processing unit 22 and the modem unit 24 may perform receiving processing on "L-STF", "L-SIG" and "TH-SIG". For that purpose, a storage unit for storing the time-domain signals 200 is provided in the radio apparatus 10, and the baseband processing unit 22 and the modem unit 24 process again "L-STF", "L-SIG" and "HT-SIG" in the time-domain signals 200 stored in the storage unit after the timing has been detected. According to this modification, "HT-SIG" once again undergoes the receiving processing at the timing detected with high accuracy, so that the accuracy in processing "HT-SIG" can be enhanced.

In an embodiment of the present invention, the comparison unit 44 selects, among a plurality of timings, the timing that exists in the foremost position. However, this should not be considered as limiting and, for example, the comparison unit 44 may determine the timing by performing statistical processing on a plurality of timings. For example, the averaging processing may be performed on the timings by weighting them according to the correlation values corresponding to the respectively timings. According to this modification, the timing can be determined in consideration of the effect of a plurality of timings.

While the preferred embodiments of the present invention have been described using specific terms, such description is for illustrative purposes only, and it is to be understood that changes and variations may be made without departing from the spirit or scope of the appended claims.

What is claimed is:

1. A receiving apparatus, comprising:
a receiver which receives a packet signal wherein the packet signal is such that a first data signal is assigned posterior to a first known signal, a second known signal is assigned posterior to the first data signal, and a second data signal is assigned posterior to the second known signal;
a first detector which detects a temporary timing in a manner such that the presence of the first known signal in the packet signal is detected by performing correlation processing on the first known signal in the packet signal received by said receiver;
a first processing unit which detects the presence of the second known signal in the packet signal, by processing the first data in the packet signal at the temporary timing detected in said first detector;
a second detector which detects a timing by performing correlation processing on the second known signal in the packet signal received by said receiver when the presence of the second known signal is detected by said first detector; and
a second processing unit which processes the second data signal in the packet signal, at the timing detected by said second detector,
wherein an identical pattern is contained both in the first known signal and the second known signal in the packet signal received in said receiver.

2. A receiving apparatus according to claim 1, wherein a correlator to perform the correlation processing in said first detector and a correlator to perform the correlation processing in said second detector are put to a common use.

3. A receiving apparatus according to claim 1, wherein said receiver receives another packet signal that contains a first known signal and, in the another packet signal, constellation of part posterior to the first known signal differs from constellation of at least part of a first data, and
wherein when in the packet signal received by said receiver the constellation of part posterior to the first known signal corresponds to the constellation of at lease part of the first data signal, it is determined by said first processing unit that the presence of the second known signal in the packet signal has been detected.

4. A receiving apparatus according to claim 1, wherein the packet signal received in said receiver is composed of a plurality of streams, and while using as a reference a second known signal assigned to one of a plurality of streams, a cyclic timing shift within the second known signal is applied to a second known signal assigned to other stream,
said second detector including:
a derivation unit which derives, as candidates for timing, a timing corresponding to the second known signal serving as the reference and a timing corresponding to the second known signal to which a timing shift is applied, based on a correlation value;
a shift unit which applies a timing shift corresponding to an amount of timing shift, to the second known signal to which a timing shift is applied, among the candidates for timing derived by the derivation unit; and
a decision unit which determines a timing, based on the timing shifted by the shift unit and the timing corresponding to the second known signal serving as the reference among the candidates for timing derived by the derivation unit.

5. A receiving apparatus according to claim 1, further comprising a storage unit which stores the packet signal received by said receiver,
wherein when the second data signal in the packet signal is processed at the timing detected by said second detector, said second processing unit processes again the first data signal in the packet signal stored in said storage unit.

\* \* \* \* \*